(12) United States Patent
Bahna et al.

(10) Patent No.: US 10,801,492 B2
(45) Date of Patent: Oct. 13, 2020

(54) SWASH PLATE ANGLE SENSOR

(71) Applicant: Danfoss Power Solutions GmbH & Co OHG, Neumunster (DE)

(72) Inventors: Peter Bahna, Pruzina (SK); Suenje Marsch, Ehndorf (DE); Heiko Laffrenzen, Ostenfeld (DE)

(73) Assignee: DANFOSS POWER SOLUTIONS G.M.B.H. & CO. OHG, Neumunster (DE)

(*) Notice: Subject to any disclaimer, the term of this patent is extended or adjusted under 35 U.S.C. 154(b) by 163 days.

(21) Appl. No.: 16/069,230

(22) PCT Filed: Dec. 7, 2016

(86) PCT No.: PCT/EP2016/080125
§ 371 (c)(1),
(2) Date: Jul. 11, 2018

(87) PCT Pub. No.: WO2017/121545
PCT Pub. Date: Jul. 20, 2017

(65) Prior Publication Data
US 2019/0024656 A1 Jan. 24, 2019

(30) Foreign Application Priority Data
Jan. 12, 2016 (DE) .......... 10 2016 200 234

(51) Int. Cl.
*F04B 51/00* (2006.01)
*G01D 5/14* (2006.01)
(Continued)

(52) U.S. Cl.
CPC .......... *F04B 51/00* (2013.01); *F04B 1/2078* (2013.01); *F04B 1/324* (2013.01); *G01D 5/14* (2013.01);
(Continued)

(58) Field of Classification Search
CPC ........ G01N 27/04; G01N 27/02; G01N 27/06; G01N 33/18; G01N 27/045
(Continued)

(56) References Cited

U.S. PATENT DOCUMENTS 5,262,871 A * 11/1993 Wilder .............. H01L 27/14609
257/E27.132
5,790,191 A * 8/1998 Zhang .................. H04N 3/1568
348/300
(Continued)

FOREIGN PATENT DOCUMENTS

| CN | 101044318 A | 9/2007 |
|---|---|---|
| CN | 104254690 A | 12/2014 |

(Continued)

OTHER PUBLICATIONS

International Search Report for PCT Serial No. PCT/EP2016/080125 dated Mar. 14, 2017.

*Primary Examiner* — Giovanni Astacio-Oquendo
(74) *Attorney, Agent, or Firm* — McCormick, Paulding & Huber PLLC

(57) ABSTRACT

The invention is directed to a swashplate angle sensor (10) for a variable displacement hydraulic unit (1). The hydraulic unit (1) comprising a housing (2), within which a swashplate (3) with a rod shaped feedback-link (12) fixedly attached to the swashplate (3) is arranged pivotable around a swashplate axis (7). The angle sensor (10) comprising a magnet (16) mounted rotatable on a magnet carrier (13), and a sensor (15) for sensing the orientation of the magnet (16). The magnet carrier (13) is located in a control block (14) attached to the housing (2) and is located parallel to the feedback-link (12). The magnet carrier (13) is rotatable around a sensor axis (18) being parallel to the swashplate axis (7). A linkage spring (11) provides a connection between the feedback-link (12) and the magnet carrier (13)

(Continued)

such that a pivoting of the swashplate (3) with the feedback-link (12) causes a rotation of the magnet carrier (13).

20 Claims, 3 Drawing Sheets

(51) Int. Cl.
    *F04B 1/2078*     (2020.01)
    *F04B 1/324*     (2020.01)

(52) U.S. Cl.
    CPC .... *F04B 2201/12051* (2013.01); *G01D 5/145* (2013.01)

(58) Field of Classification Search
    USPC .................. 324/693, 600, 649, 691, 207.25
    See application file for complete search history.

(56) References Cited

U.S. PATENT DOCUMENTS

| | | | | |
|---|---|---|---|---|
| 8,462,240 | B2* | 6/2013 | Osawa | H04N 5/341 250/208.1 |
| 2004/0115065 | A1 | 6/2004 | Du et al. | |
| 2008/0041223 | A1 | 2/2008 | Takahashi et al. | |
| 2016/0178714 | A1* | 6/2016 | Fautz | G01R 33/483 324/309 |
| 2017/0319097 | A1* | 11/2017 | Amthor | A61B 5/055 |
| 2018/0024214 | A1* | 1/2018 | Bhat | G01R 33/5617 324/309 |

FOREIGN PATENT DOCUMENTS

| | | |
|---|---|---|
| CN | 104334879 A | 2/2015 |
| CN | 104948419 A | 9/2015 |
| DE | 69105783 T2 | 4/1995 |
| DE | 10112146 A1 | 9/2002 |
| DE | 10119236 C1 | 12/2002 |
| DE | 10119239 C1 | 12/2002 |
| DE | 102004033314 B3 | 12/2005 |
| DE | 102010045539 A1 | 3/2012 |
| DE | 102010045540 A1 | 3/2012 |
| DE | 102013220298 A1 | 4/2015 |
| EP | 0445702 A1 | 9/1991 |
| EP | 1803935 A2 | 7/2007 |
| EP | 1892413 A1 | 2/2008 |
| JP | H06193554 A | 7/1994 |
| JP | 2003269324 A | 9/2003 |

* cited by examiner

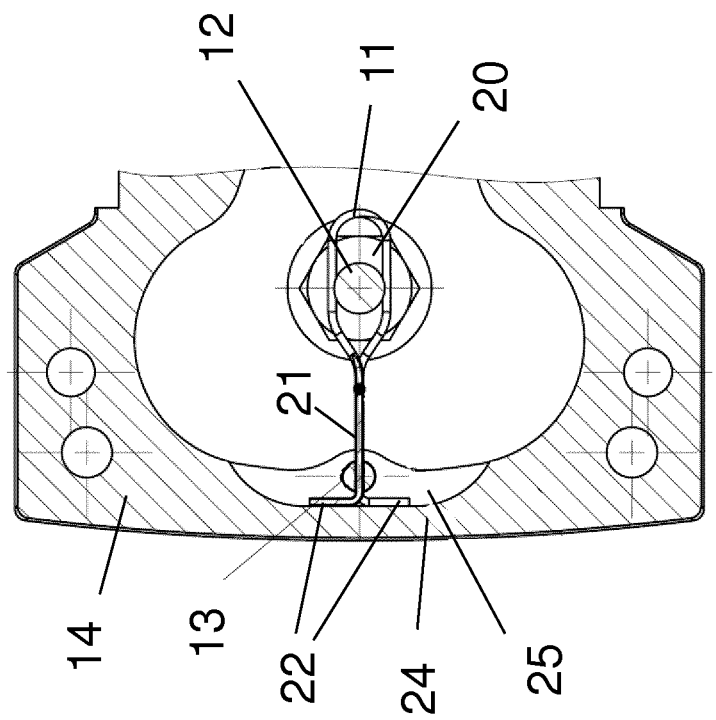
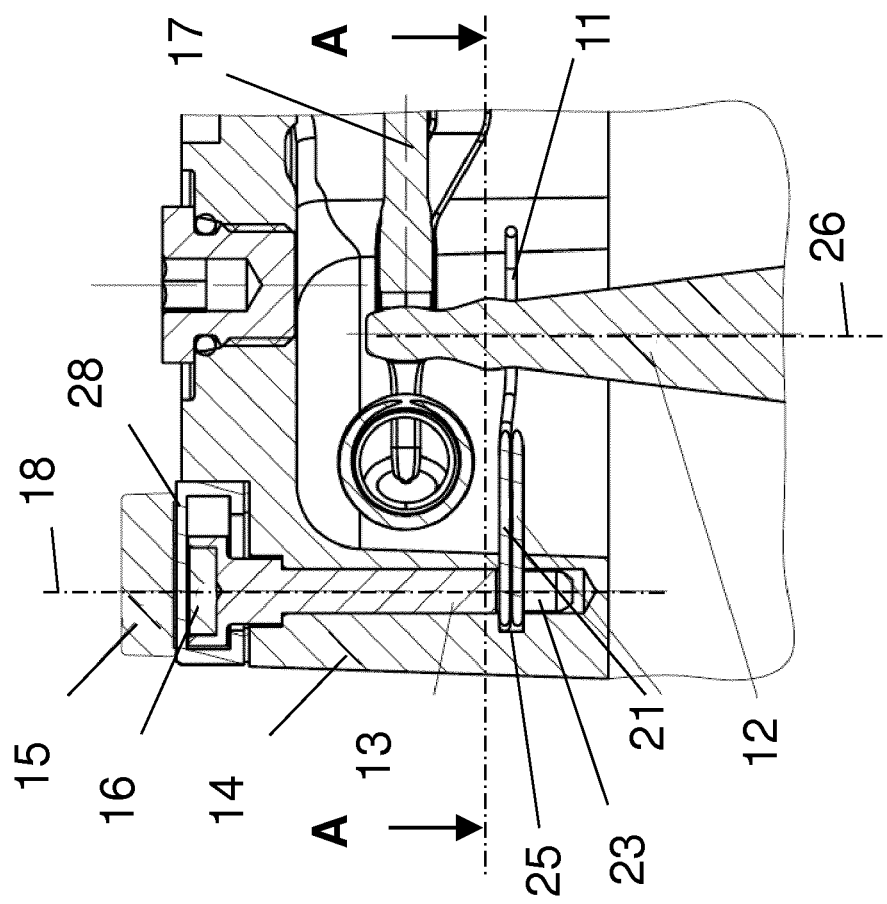

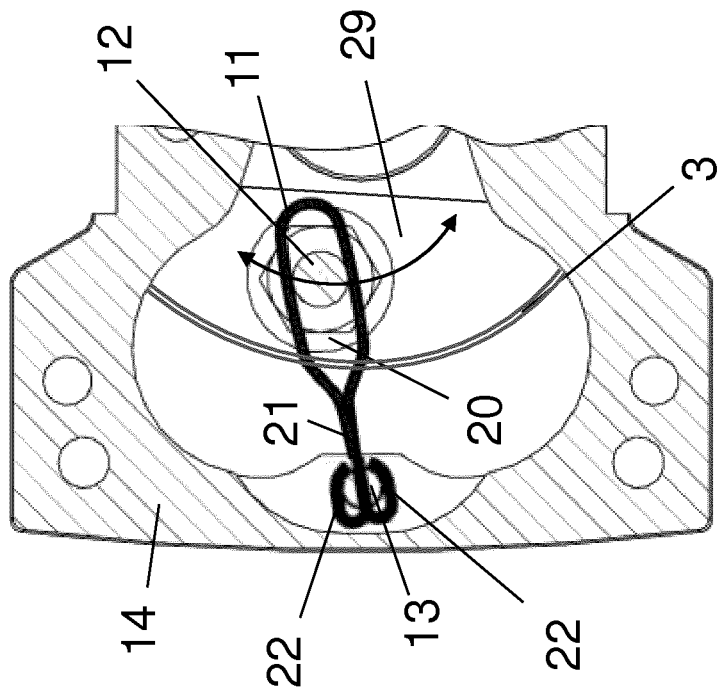
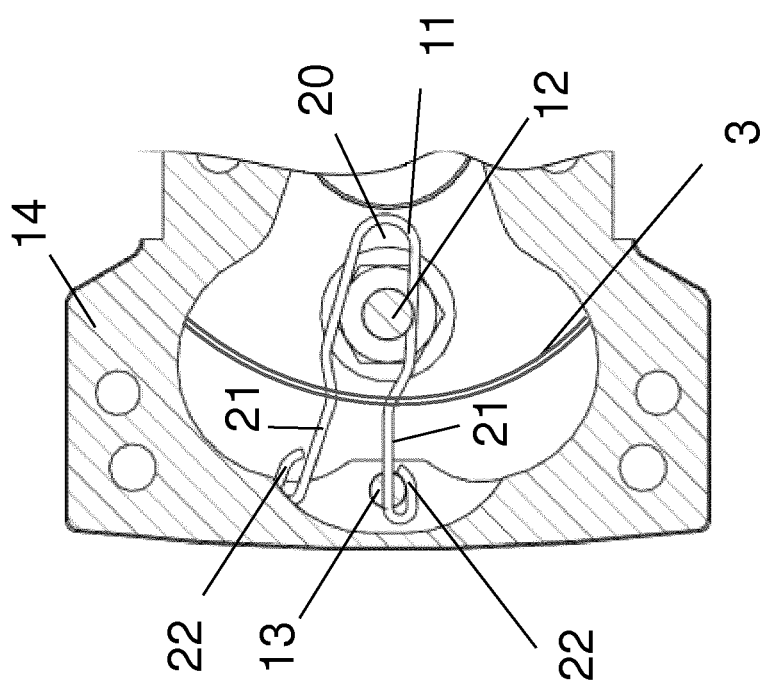

SWASH PLATE ANGLE SENSOR

CROSS-REFERENCE TO RELATED APPLICATIONS

This application is a National Stage application of International Patent Application No. PCT/EP2016/080125, filed on Dec. 7, 2016, which claims priority to German Patent Application No. 10 2016 200 234.1, filed on Jan. 12, 2016, each of which is hereby incorporated by reference in its entirety.

TECHNICAL FIELD

The present invention is directed to a swashplate angle sensor for a variable displacement hydraulic unit with a swashplate having a rod shaped feedback-link fixedly attached to the pivotable swashplate. The angle sensor comprising a magnet mounted on a magnet carrier rotatable around a sensor axis, and a sensor for sensing the orientation of the magnet, according to the preamble of claim 1.

BACKGROUND

Swashplate angle sensors serve for the control of the variable displacement of hydraulic motors or pumps. US 2004/0115065A1 describes a variable displacement pump unit in which the angular position of the swashplate is measured with a magnetic sensor. To this purpose a magnet is mounted on the swashplate and rotates with the swashplate. A semiconductor chip is disposed in the housing of the pump and proximate to the magnet. A controller directs a current through the semiconductor chip and determines the voltage across the chip. This voltage depends on the relative position of the chip in the magnetic field according to the Hall-effect and is used to determine the angle of the magnet and thus of the swashplate relative to the chip and thus to the housing.

DE 10 2013 220 298 A1 describes a bent axis hydraulic unit, in which the position of the displacement element is also determined by magnetic means. Here the magnet is attached to the end of a hollow tube mounted rotatable on the servo piston that controls the angular position of the swashplate. The tube has a longitudinal slit, oriented at an angle to the tube axis. Into the tube a cam connected to the servo piston protrudes. A longitudinal displacement of the servo piston imparts a rotation to the tube with the magnet. This rotation is sensed by a magnetic sensor located on the control block of the hydraulic unit.

In DE 101 19 239 C1 a variable displacement hydraulic unit is described that features a cylinder block which is swivel-able about an axis in order to control the displacement of the unit. A rotation sensor of an unspecified nature for the measurement of the tilt angle of the cylinder block is mounted on the housing of the hydraulic unit. The movable part of this sensor is coaxial with the tilt axis of the cylinder block and is connected to a carrier of the cylinder block by means of a wire.

The swashplate angle sensors known from the state of the art are relatively complicated and space consuming and, due to their relatively complicated design, also relatively costly, if they cannot be implemented into a rotational shaft around which the swashplate or the displacement element is rotatable. They also can be subjected to inaccuracies due to machining tolerances and wear during usage of the hydraulic unit. Also, in general, it is not possible to install them in existing hydraulic units without major effort.

SUMMARY

The object of the invention is to provide a variable displacement hydraulic unit that is accurate and reliable, being at the same time capable to compensate wear and production tolerances.

Additionally, the inventive swashplate angle sensor should be suitable to be produced and installed at low cost, and, where applicable, should be installable as well in existing hydraulic units of the swashplate or the bent axis construction type.

The solution of the object of the invention is provided by a swashplate angle sensor in a variable displacement hydraulic unit according to the preamble of claim 1 and characterized by the features given in the characterizing part of claim 1. In a preferred embodiment this solution comprises a magnet carrier that is located in a control block attached to the housing of the hydraulic unit, and is rotatable around a sensor axis. A mechanical linkage element, preferably in the form of a linkage spring, provides a linkage between the feedback-link attached to the swashplate and the magnet carrier such that a pivoting of the swashplate causes by means of the feedback-link a rotation of the magnet carrier. By the rotation of the magnet carrier a magnet is rotated around the sensor axis causing therewith a change of the measurement value, here, for instance, the voltage over the sensor.

Hydraulic units of the swash plate construction type as well as hydraulic units of the bent axis construction type frequently can be pivoted around a rotational axis to change their displacement volume. Thereby, the displacement elements of these hydraulic units, e.g. the swashplate, pivots around a centre line located remote from the actuation means performing the displacement. In many cases the pivot centre line is located in the area of the pressurized and/or rotating elements of the hydrostatic unit. Therefore, in many cases there is no adequate space to install sensible angle sensor means close to the centre axis. Otherwise it is complicated to do so, without changing and/or enlarging the design of the hydrostatic unit or to protect the angle sensor of being damaged. In other designs of hydraulic units one side of the housing close to the centre axis is the so called "clean side" onto which the hydraulic unit can be rest on. Therefore, this side/area should be free of sensible sensor elements.

For receiving a feedback of the displacement element position, frequently a feedback link is provided on the displacement element indicating the actual position of the displacement element. Preferably, the feedback-link protrudes into the control block of a hydraulic unit in order to feed back the swashplate position to the control unit. However, the absolute position of the feedback link, respectively of the displacement element, cannot be determined directly for controlling/adjusting the displacement by the control unit. However, the feedback link is used normally for guiding or bringing back the control spool into its initial position, e.g. the control spool of an electronic control unit (EDC) into its neutral position. Thus, there is no control of the value of the displacement angle, which is selected, for instance, by an operator or by the control unit of a working machine. In general the feedback link is used to provide a counter signal to the actuator means of the control device for signalling that the displacement according to a certain displacement force is reached. Thereby, no control or measurement of the displacement angle is done.

The mechanical configuration of the swashplate angle sensor according to the invention transforms the circular arc motion of the feedback link of the swashplate into a rotation of the magnet carrier around its sensor axis. This rotation is sensed by the magnetic sensor and transformed into an electrical signal that can be utilized by the control unit located in the control block of the hydraulic unit to determine the angle of the swashplate. Nonlinearities between the pivoting angle of the swashplate and the induced rotation of the magnet carrier which are caused by the variation in distance between the feedback link and the magnet carrier—as the feedback link moves on a circular arc—can be compensated by a slot, elongated or oblong opening in the linkage element. These nonlinearities are of a purely geometrical origin and depend on the dimensions and distances between the pivoting axis of the swashplate and the moving centre of the feedback link and the axis of the magnet carrier.

According to one embodiment the invention, the linkage element of the swashplate angle sensor has an oblong opening section surrounding the feedback-link and forming an elongated opening between two legs of the linkage element. This section of the linkage element is preferable in tight slide-able contact with the feedback link due to e.g. a compressive spring action that tends to bend the legs or the sidewalls of the elongated opening inward against the feedback link. In one embodiment the oblong or elongated opening section can by designed as an open or closed U-shaped hole-section, which is followed e.g. by two adjoining legs. Thereby, the ends of the legs are inserted, for instance, in a slit in the magnet carrier. The linkage element in a further possible embodiment of the inventive swashplate angle sensor is preferably of a symmetric configuration that contacts the feedback link on two opposite sides to ensure a self-centring action of the elongated opening on the feedback link. By self-centring of the elongated opening it is expressed that the two lateral parts of the linkage element forming the elongated opening executes each a force towards the feedback pin such that the lateral parts of the elongated opening are always in tight slide-able contact with the lateral surface of the feedback pin. The internal linkage element forces centre the elongated opening on the feedback link. This also provides an identical response of the swashplate angle sensor in both directions of movement of the feedback link, e.g. away from a central position or any other position. However, in a preferred embodiment, the end of the linkage element or the ends of a linkage spring are bent around the sidewalls of the slit in the magnet carrier on that end which is facing away from the feedback link. The ends of the legs in one embodiment are bent to an angle of 90° or even greater than 90° to avoid any contact with the housing or walls of a control block. This prevents errors introduced by friction and reduces possible hysteresis effects caused by them.

The length of the U-shaped section of the linkage element defining an oblong opening into which the feedback element protrudes has to be greater than the adjoining cross section of the feedback-link. This opening must be sufficient to accommodate the variation in distance between the feedback link and the magnet carrier as the feedback link moves in a circular arc centred on the swashplate axis of rotation.

Preferably the end of the linkage element protruding from the magnet carrier on the other side of the U-shaped section is bent at an angle of at least 90°. This ensures a fixation of the linkage spring on the magnet carrier in the longitudinal direction of the linkage spring. A fixation of the linkage spring in the axial direction of the magnet carrier exemplarily can be provided by forming a grove in the inner wall of the housing of the control block, into which the end of the linkage element is inserted and which housing is supporting the inventive angle sensor. In this configuration the end of the linkage element can be in slide-able contact with an inner wall of the control block. In order to minimize friction it is preferred to bend the end of the linkage element at an angle of more than 90°, such that the ends contact the side wall of the control block only in a small area.

It is understood however, that a contact of the end of the linkage element with the inner wall of the control block or any other structure are not required in realizing the invention. This is because the length of the elongated U-shaped hole-section of the linkage element can be made sufficiently long to accommodate some longitudinal movement of the linkage element. Also, the action/the movement of the linkage element tends to press the leg against the side walls of the slit in the magnet carrier, providing some frictional fixation. In any case the contact of the end of the linkage element with the inner wall of the control block can be rather loose, because only the distance between the axis of rotation of the magnet carrier and the centre of the feedback link is of importance for the determination of an angle of rotation.

In one preferred embodiment the linkage element can be a linkage spring of torsional type with a rectangular, round or oval cross-section. It can be formed by a rod or wire of spring steel bent in a generally hair-pin shape. In another embodiment the spring is for instance of a leaf spring type bent into a hair-pin shape. In a further embodiment one can imagine that the linkage element between the feedback link and the magnet carrier comprises a stiff leg connected to the magnet carrier and a flexible spring-like elongated loop section adjoining the feedback link in a pre-stressed manner. In another preferred embodiment the linkage element comprise a relative stiff body forming the elongated hole-section. Here, for instance, the inner sidewalls of the elongated hole-section may comprise a smaller adjoining width than the diameter of the feedback link but can be covered by an elastic material being compressed in order to compensate production tolerances and wear.

For reducing production tolerances of the feedback link and the linkage element itself it is preferred that the part of the linkage element surrounding the feedback link is design such that the width of the elongated hole section—when no feedback link is mounted within—is smaller than the cross section of the feedback link being held by the linkage element. Therefore, the elongated hole area of the linkage element holding the feedback link preferably is designed flexible or elastic in order that the feedback link is held in this area in a pre-stressed manner without clearance in any position of the swashplate or in any direction of movement of the same. Thereby the production tolerances can be compensated as well as wear occurring during the operational life of the hydraulic unit.

The invention provides a swashplate or bent axis angle sensor that is simple and robust in construction and that can be installed in a side wall of a control block or in a section of a hydraulic unit in suitable proximity of the feedback link connected to the pivot-able swashplate or a carrier thereof. A retrofit in existing control blocks of hydraulic units is possible without major machining operations, provided a suitable side wall of the control block or other part of the housing shows sufficient thickness. The sensor is self-positioning, hysteresis free and easy to assemble. Also, the swashplate angle sensor automatically compensates machining tolerances or wear of components in contact thereof.

BRIEF DESCRIPTION OF THE DRAWINGS

Exemplary embodiments of the invention not limiting the scope of the inventive idea are shown in FIGS. 1 to 5 and will be described in the following.

FIG. 2 depicts a detail of the schematic cross-section shown in FIG. 1;

FIG. 3 depicts a schematic cross-section of a part of the hydraulic unit shown in FIG. 1 according to line A-A indicated in FIG. 2;

FIG. 4 shows the cross-section according to FIG. 3 with an exemplary used linkage spring in an uncompressed condition, FIG. 5 depicts the cross-section of FIG. 4 in a non-neutral operating condition of the hydraulic unit and the exemplary used linkage spring in a compressed condition.

DETAILED DESCRIPTION

Figure 1:
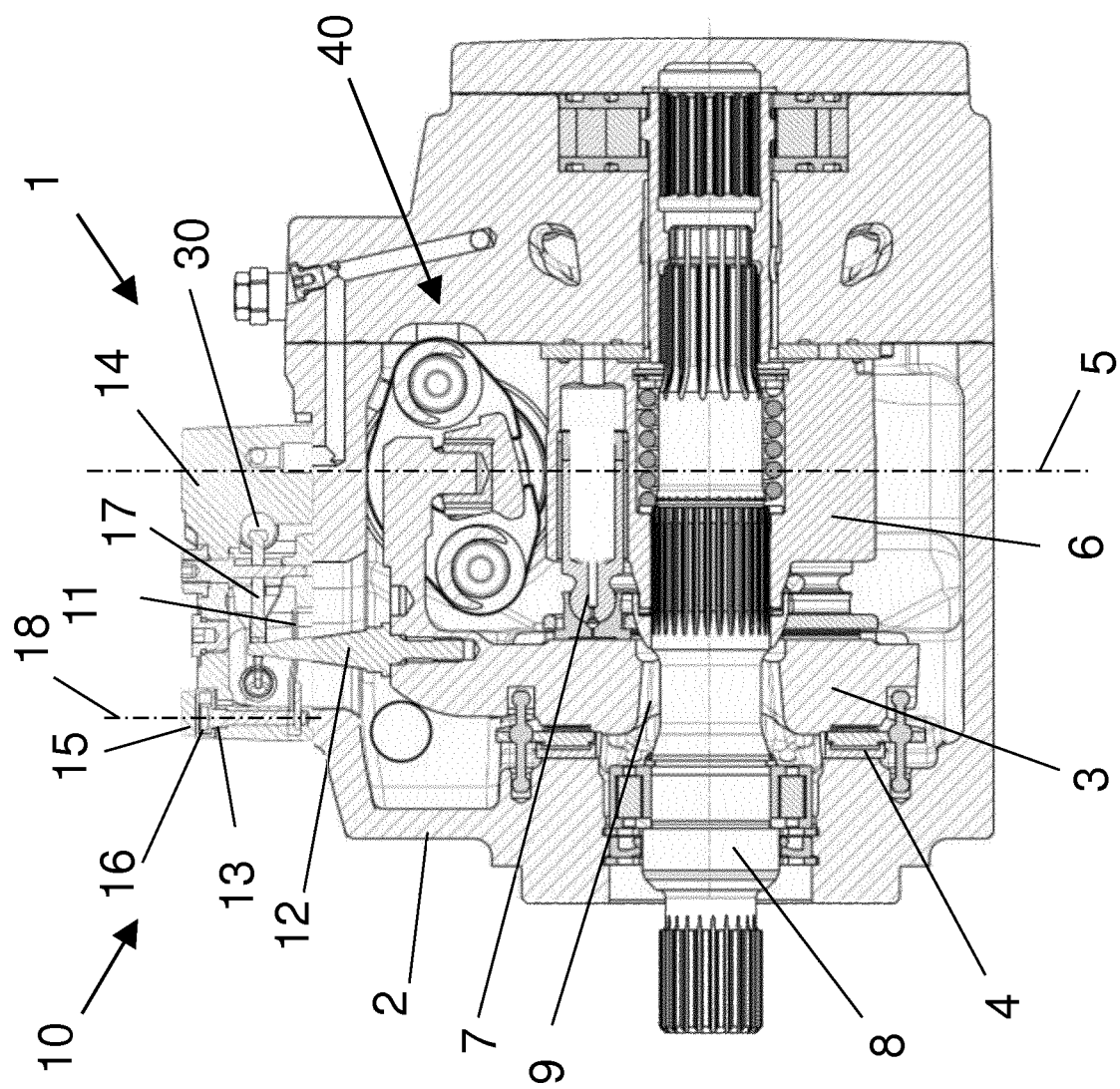
FIG. 1 shows a schematic cross-section of a hydraulic unit having a swashplate angle sensor according to an exemplary embodiment of the invention.

FIG. 1 shows a schematic cross-section of a variable displacement hydraulic unit 1 having a swashplate angle sensor 10 according to an exemplary embodiment of the invention. The hydraulic unit 1 comprises a housing 2 that contains a swashplate 3 supported on a cradle bearing 4 and rotatable about a swashplate pivot axis 5, indicated by a dash-dotted line. The rotation of the swashplate 3 is usually controlled by means of a servo-system 40 using electromagnetic, mechanical or hydraulic actuators. Connected to the swashplate 3 is a feedback link 12 which protrudes into a control block 14 of hydraulic unit 1 and is oriented in such a manner that its longitudinal axis 26 (see FIG. 2) is parallel to the axis of rotation 5 of swashplate 3. The generally rod-shaped feedback link 12 is firmly connected to the swashplate 3 and participates in any rotation of the swashplate 3 thereby returning the angular position of the swashplate 3 with respect to the axis of drive shaft 8. Feedback link 12 interacts with feedback lever 17 connected to the control spool of control unit 30 of hydraulic unit 1. Such a control unit and its functioning for instance is described in DE 10 2004 033 314 B3 and should therefore not be descript in detail here.

Housing 2 of hydraulic unit 1 also contains a cylinder block 6 with several work pistons 7. Cylinder block 6 is connected to a drive shaft 8 and is rotatable about the axis of drive shaft 8. The drive shaft 8 extends through an enlarged opening 9 in the swashplate 3, permitting a tilting of swashplate 3 relative to drive shaft 8. The ends of the pistons 7 protruding from cylinder block 6 are in slide-able contact with the swashplate 3. By tilting swashplate 3 via servo system 40 triggered by control unit 30 the stroke of pistons 7 is modified, i.e. the displacement of hydraulic unit 1 is changed and therewith the position of feedback link 12 in control block 14. These features and the general functioning of variable displacement hydraulic units 1 are well known such that further detailed description thereof can be omitted here as well.

In an exemplary embodiment of the invention shown in FIG. 1 hydraulic unit 1 comprises a swashplate angle sensor 10 housed in control block 14 being attached to housing 2 of hydraulic unit 1. The angle sensor 10 comprises a generally rod-shaped magnet carrier 13 supported rotatable about its longitudinal axis 18 in a wall of control block 14. This longitudinal axis 18 is parallel to the longitudinal axis 26 of feedback link 12 which in turn is parallel to pivot axis 5 of swashplate 3. A magnet 16 is firmly affixed to one end of magnet carrier 13 and rotatable therewith. A magnetic rotation sensor 15 is provided on control block 14 directly adjacent to magnet 16. Thereby, any rotation of magnet 16 is sensed by sensor 15 and transformed into an electrical signal that can be utilized by a control system (not shown) associated with hydraulic unit 1 for controlling the operation thereof.

According to the invention, between feedback link 12 and magnet carrier 13 a linkage is provided by means of a mechanical linkage element 11. In a preferred embodiment of the invention linkage element 11 consists of a linkage spring, generally bent in a hairpin shape, as it will be described in more detail below.

In the following figures all reference numerals denoting similar constructive features will be retained. Also, linkage element 11 and linkage spring 11 will be used as synonymous terms.

FIG. 2 shows a detail of the schematic cross-section of hydraulic unit 1 according to FIG. 1. Depicted is a control block 14 with the upper section of feedback link 12 that extends into control block 14. Linkage spring 11 extends from feedback link 12 into a wall section of control block 14 and is connected to magnet carrier 13 mounted rotatable in a wall section of control block 14. Leg 21 of linkage spring 11 is held for instance in a slit in magnet carrier 13 and provide a mechanical connection between magnet carrier 13 and feedback link 12 such that a circular-arc movement of feedback link 12 causes a rotation of magnet carrier 13. On the upper face of magnet carrier 13 a magnet 16 is mounted and rotates with magnet carrier 13 when linkage spring 11 imparts a rotation to magnet carrier 13. On the outside of control block 14 a magnetic rotation sensor 15 is situated opposite magnet 16. Sensor 15 and magnet 16 are separated, e.g. by a non-magnetic membrane that protects magnet 16 and, preferably, also seals the interior of hydraulic unit 1, preventing leakage of hydraulic fluid or entry of dirt.

FIG. 3 depicts a schematic cross-section of a part of the hydraulic unit shown in FIG. 1 according to line A-A indicated in FIG. 2. The hydraulic unit 1 shown in FIG. 3 is in a neutral operating condition in which the tilt angle of swashplate 3 with respect to the axis of rotation of drive shaft 8 is zero degrees (see FIG. 1).

As can be seen in FIG. 3 linkage spring 11 has a closed U-shaped section 20, respectively an elongated hole-section 20 that defines an oblong opening that surrounds an axial cross section (see also FIG. 2) of feedback link 12. Two legs 21 of linkage spring 11 are held in a slit 23 in the base of magnet carrier 13. The ends 22 of legs 21 of linkage spring 11 protruding from magnet carrier 13 are bent in the embodiment shown in FIG. 3 at an angle of approximately 90° and are in slide-able contact with inner wall 24 of grove 25 in control block 14. This configuration of linkage spring 11 supports the centring of linkage element 11 on feedback link 12. However, it has the drawback of undesirable friction of the ends 22 of linkage spring 11 on an inner wall 24 of control block 14. In another embodiment it is preferred to bend the ends 22 of the legs 21 of linkage spring 11 at an angle of more than 90°, as shown in an exemplary manner in FIGS. 4 and 5, and/or to eliminate any contact between the ends 22 of linkage spring 11 and other parts of hydraulic unit 1 not being the magnet carrier 13.

FIG. 4 shows the cross-section according to FIG. 3 with a linkage spring 11 used in an exemplary preferred embodiment of the invention in an uncompressed not final assembled condition. In this Figure only one leg 21 of linkage spring 11 is inserted in the slit 23 at the base of magnet carrier 13. Visible is the generally hairpin shape of linkage spring 11 with its closed U-shaped section 20, legs 21 and ends 22. Ends 22 are bent at an angle of more than 90° and serve to fix linkage spring 11 in slot 23 of magnet carrier 13. In this embodiment the ends 22 of linkage spring 11 are not in contact with inner wall 24 of control block 14 and move freely in an grove 25 provided in the inner wall 24 of control block 14 containing also the bore for magnet carrier 13.

Linkage spring 11 is preferably made of an elastic metal, such as spring steel, and may have a rectangular, round or oval cross-section. However, one can imagine linkage element 11 made of a plastic material, for instance in a reinforced version. In the final assembled state, shown in FIGS. 2, 3 and 5, the U-shaped section 20 of linkage spring 11 is in intimate contact with feedback link 12. The oblong opening provided by the U-shaped section 20 in the linkage element 11 permits a relative motion, i.e. a distance change of feedback link 12 with respect to the axis of the magnet carrier 13. This allows to accommodate the movement of the feedback link 14 on a circular arc centred on the tilt axis 5 of swashplate 3 and indicated in FIG. 5 by a double headed arrow 29 depicting the trajectory of feedback link 12.

Both sides of the U-shaped section 20 of linkage spring 11 press against the sides of feedback link 12 when both ends 22 of linkage spring 11 are inserted in slit 23 of magnet carrier 13. This ensures a positive contact between feedback link 12 and linkage spring 11 at any time, and enables to compensate for any production inaccuracies or wear of feedback element 12 or linkage spring 11 itself, however, permitting a relatively free movement of feedback link 12 in the direction of the oblong opening 20 provided by the U-shaped section of linkage spring 11. Friction is reduced under operation conditions by the (unavoidable) presence of leakage of hydraulic fluid in the housing 2 of hydraulic unit 1 serving as a lubricant.

In operation of swashplate angle sensor 10 of the invention any movement of the swashplate 3 is shared by feedback link 11, because the latter is fixedly connected therewith. Thus feedback link 12 moves together with swashplate 3 on a circular arc centred on tilt axis 5 of swashplate 3. This movement imparts a rotation of linkage spring 11 which is transmitted to magnet carrier 13. Thereby, the longitudinal axis 18 of magnet carrier 13 defines the axis of rotation of linkage spring 11. Magnet 16 moves/rotates together with magnet carrier 13 and thus changes the orientation of magnet 16 with respect to the sensing element of magnetic sensor 15, thereby inducing a corresponding signal in sensor 15. This signal provides a measurement value of the actual angle of swashplate 3 relative to a given reference position. This being normally the neutral, i.e. the zero angle position, if, for instance, the swashplate being orthogonal to the axis of driving shaft 8 of hydraulic unit 1, i.e. work pistons 7 do not show any displacement volume.

FIG. 5 depicts the cross-section of FIG. 4 in a non-neutral operating condition of hydraulic unit 1 and shows the exemplary used linkage spring 11 in a compressed condition. Swashplate 3, of which only a portion is visible in FIG. 5, is displaced relative to its neutral position, depicted in FIGS. 3 and 4. Feedback link 12 has followed this displacement and moved along a circular arc, indicated by the double headed arrow 29. This causes a rotation of linkage spring 11 imparted to magnet carrier 13. It is evident from FIG. 5 that the distance between the centre of feedback link 12 and the axis of rotation 18 of magnet carrier 13 varies as the swashplate 3 tilts, because feedback link 12 moves on a convex arc relative to the fixed axis of rotation 18 of magnet carrier 13. However, the nonlinear response of the magnet angle of rotation versus the tilt angle of swashplate 3 caused by this effect is of a purely geometrical origin that can be compensated readily by the given actual dimensions and distances between the different components of the sensor system.

In summary, the invention provides a simple and robust sensor system for the determination of a tilt angle of the swashplate in variable displacement hydraulic units. Such sensor systems can be installed also in existing hydraulic units requiring only relative minor modifications and machining. Further, such an inventive angle sensor can be installed also in hydraulic units of the bent axis construction type. Hereby the feedback link is located on the displacement element guiding the displacement of the cylinder block.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A swashplate angle sensor for a variable displacement hydraulic unit comprising a pivot-able swashplate with a rod shaped feedback-link attached thereon, the angle sensor comprising a magnet mounted on a magnet carrier rotatable around a sensor axis, and a sensor for sensing the orientation of the magnet, wherein
the angle sensor comprises a linkage element providing a mechanical linkage between the feedback-link and the magnet carrier such that a pivoting of the swashplate moves the linkage element via the feedback-link and causes a rotation of the magnet carrier.

2. The swashplate angle sensor of claim 1, wherein the linkage element comprises a spring with a U-shaped elongated hole-section surrounding the feedback-link in a tight slide-able contact therewith, and with two legs, the ends of which are coupled to the magnet carrier.

3. The swashplate angle sensor of claim 2, wherein the length of the elongated hole-section of the linkage element is greater than the adjoining diameter of the feedback-link.

4. The swashplate angle sensor of claim 3, wherein the ends of the linkage element protruding from the magnet carrier are bent at an angle, wherein the angle is greater than or equal to 90°.

5. The swashplate angle sensor of claim 3, wherein the linkage element is a linkage spring of torsional type with a rectangular, round or oval cross-section.

6. The swashplate angle sensor of claim 3, wherein the ends of the linkage element are in slide-able contact with an inner wall of the control block.

7. The swashplate angle sensor of claim 2, wherein the ends of the linkage element protruding from the magnet carrier are bent at an angle, wherein the angle is greater than or equal to 90°.

8. The swashplate angle sensor of claim 2, wherein the linkage element is a linkage spring of torsional type with a rectangular, round or oval cross-section.

9. The swashplate angle sensor of claim 2, wherein the ends of the linkage element are in slide-able contact with an inner wall of the control block.

10. The swashplate angle sensor of claim 1, wherein the linkage element comprises an elongated hole-section surrounding the feedback-link in a tight slide-able contact therewith, and an adjoining leg, the end of which is coupled to the magnet carrier.

11. The swashplate angle sensor of claim 10, wherein the length of the elongated hole-section of the linkage element is greater than the adjoining diameter of the feedback-link.

12. The swashplate angle sensor of claim 1, wherein the ends of the linkage element protruding from the magnet carrier are bent at an angle, wherein the angle is greater than or equal to 90°.

13. The swashplate angle sensor of claim 12, wherein the linkage element is a linkage spring of torsional type with a rectangular, round or oval cross-section.

14. The swashplate angle sensor of claim 12, wherein the ends of the linkage element are in slide-able contact with an inner wall of the control block.

15. The swashplate angle sensor of claim 1, wherein the linkage element is a linkage spring of torsional type with a rectangular, round or oval cross-section.

16. The swashplate angle sensor of claim 15, wherein the ends of the linkage element are in slide-able contact with an inner wall of the control block.

17. The swashplate angle sensor of claim 1, wherein the ends of the linkage element are in slide-able contact with an inner wall of the control block.

18. The swashplate angle sensor of claim 1, wherein the sensor axis and/or the longitudinal axis of the magnet carrier is parallel to the longitudinal axis of feedback-link and/or to the swashplate pivot axis.

19. The swashplate angle sensor of claim 1, wherein the magnet carrier is situated in a housing or in a control block of the hydraulic unit.

20. A control block of a variable displacement hydraulic unit comprising a swashplate angle sensor suitable to be fixed on a housing of the variable displacement hydraulic unit and suitable to be coupled to a feedback link of the variable displacement hydraulic unit, the variable displacement hydraulic unit comprising a pivot-able swashplate with a rod shaped feedback-link attached thereon, the swashplate angle sensor comprising a magnet mounted on a magnet carrier rotatable around a sensor axis, and a sensor for sensing the orientation of the magnet, wherein the swashplate angle sensor comprises a linkage element providing a mechanical linkage between the feedback-link and the magnet carrier such that a pivoting of the swashplate moves the linkage element via the feedback-link and causes a rotation of the magnet carrier.

* * * * *